United States Patent
Chandler et al.

(10) Patent No.: US 10,443,472 B2
(45) Date of Patent: Oct. 15, 2019

(54) EXTRUDED HONEYCOMB CATALYST

(71) Applicant: Johnson Matthey Public Limited Company, London (GB)

(72) Inventors: Guy Richard Chandler, Royston (GB); Neil Robert Collins, Royston (GB); Ralf Dotzel, Redwitz (DE); Joerg Muench, Redwitz (DE); Paul Richard Phillips, Royston (GB); Gudmund Smedler, Gothenburg (SE); Andrew Peter Walker, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/789,387

(22) Filed: Oct. 20, 2017

(65) Prior Publication Data
US 2018/0298801 A1  Oct. 18, 2018

Related U.S. Application Data

(63) Continuation of application No. 14/827,918, filed on Aug. 17, 2015, now abandoned, which is a (Continued)

(30) Foreign Application Priority Data

Aug. 3, 2011 (DE) .................... 20 2011 103 994 U
Feb. 8, 2012 (GB) ..................... 1202182.0

(51) Int. Cl.
| | |
|---|---|
| *F01N 3/20* | (2006.01) |
| *B01J 37/04* | (2006.01) |
| *B01J 23/30* | (2006.01) |
| *B01D 53/94* | (2006.01) |
| *B01J 29/76* | (2006.01) |
| *B01J 29/78* | (2006.01) |
| *B01J 29/80* | (2006.01) |
| *B01J 29/85* | (2006.01) |
| *B01J 35/00* | (2006.01) |
| *B01J 35/04* | (2006.01) |
| *B01J 37/00* | (2006.01) |
| *B01J 37/02* | (2006.01) |
| *F01N 3/28* | (2006.01) |

(Continued)

(52) U.S. Cl.
CPC ............ *F01N 3/208* (2013.01); *B01D 53/94* (2013.01); *B01D 53/9418* (2013.01); *B01J 23/002* (2013.01); *B01J 23/30* (2013.01); *B01J 29/005* (2013.01); *B01J 29/48* (2013.01); *B01J 29/763* (2013.01); *B01J 29/7615* (2013.01); *B01J 29/783* (2013.01); *B01J 29/7815* (2013.01); *B01J 29/80* (2013.01); *B01J 29/85* (2013.01); *B01J 35/0006* (2013.01); *B01J 35/0073* (2013.01); *B01J 35/04* (2013.01); *B01J 37/0009* (2013.01); *B01J 37/0215* (2013.01); *B01J 37/04* (2013.01); *F01N 3/2066* (2013.01); *F01N 3/2803* (2013.01); *F01N 3/2828* (2013.01); *B01D 2255/2065* (2013.01); *B01D 2255/20707* (2013.01); *B01D 2255/20715* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/502* (2013.01); *B01D 2255/504* (2013.01); *B01D 2255/65* (2013.01); *B01D 2255/9022* (2013.01); *B01D 2257/404* (2013.01); *B01J 29/46* (2013.01); *B01J 2523/00* (2013.01); *F01N 2240/25* (2013.01); *F01N 2330/02* (2013.01); *F01N 2330/06* (2013.01); *F01N 2370/04* (2013.01); *F01N 2510/0684* (2013.01); *Y02A 50/2325* (2018.01); *Y02T 10/24* (2013.01)

(58) Field of Classification Search
CPC ............ B01D 35/0073; B01D 37/0009; B01J 2255/20776; B01J 2523/48; F01N 2370/04; Y02T 10/24
USPC .................................. 422/177, 180; 55/523
See application file for complete search history.

(56) References Cited

U.S. PATENT DOCUMENTS

| | | | |
|---|---|---|---|
| 6,413,434 B1 | 7/2002 | Nedez | |
| 6,941,742 B1 * | 9/2005 | Neufert | B01D 53/8609 423/238 |
| 7,763,222 B2 * | 7/2010 | Miyairi | F01N 3/0222 422/177 |
| 9,492,811 B2 | 11/2016 | Ogunwumi et al. | |

(Continued)

FOREIGN PATENT DOCUMENTS

| | | |
|---|---|---|
| DE | 19806062 A1 | 8/1999 |
| EP | 2213371 A1 | 8/2010 |

(Continued)

*Primary Examiner* — Tom P Duong

(57) ABSTRACT

An extruded honeycomb catalyst for nitrogen oxide reduction according to the selective catalytic reduction (SCR) method in exhaust gases from motor vehicles includes an extruded active carrier in honeycomb form having a first SCR catalytically active component and with a plurality of channels through which the exhaust gas flows during operation, and a washcoat coating having a second SCR catalytically active component being applied to the extruded body, wherein the first SCR catalytically active component and the second SCR catalytically active component are each independently one of:

Figure 1:
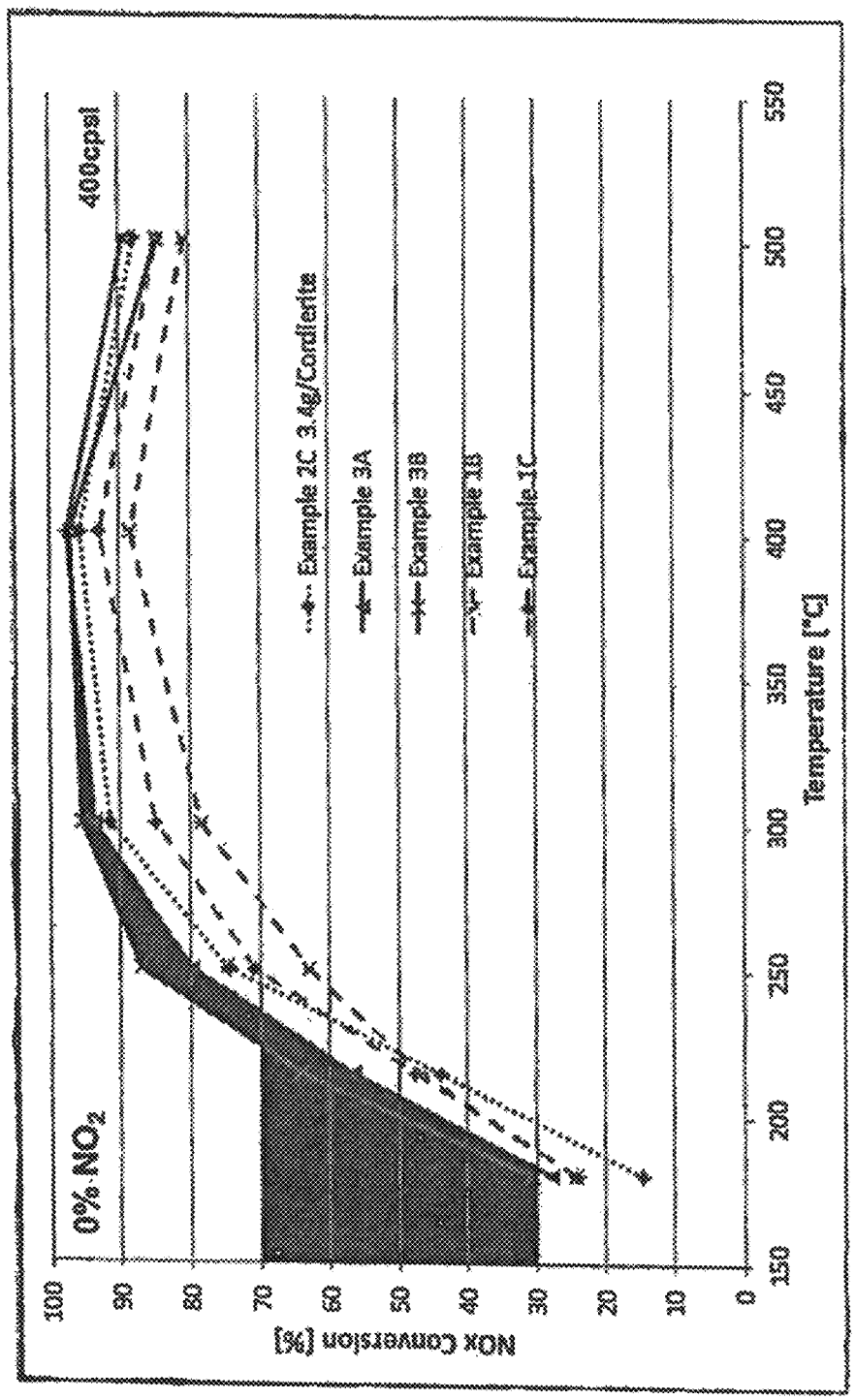

(i) vanadium catalyst with vanadium as catalytically active component;
(ii) mixed-oxide catalyst with one or more oxides, in particular those of transition metals or lanthanides as catalytically active component; and
(iii) an Fe- or a Cu-zeolite catalyst.

27 Claims, 4 Drawing Sheets

Related U.S. Application Data continuation of application No. 13/817,364, filed as application No. PCT/GB2012/051857 on Jul. 31, 2012, now Pat. No. 9,138,731.

(60) Provisional application No. 61/599,124, filed on Feb. 15, 2012.

(51) Int. Cl.
*B01J 29/48* (2006.01)
*B01J 23/00* (2006.01)
*B01J 29/00* (2006.01)
*B01J 29/46* (2006.01)

(56) References Cited

U.S. PATENT DOCUMENTS

| | | | |
|---|---|---|---|
| 2004/0258594 A1 | 12/2004 | Andreasson et al. | |
| 2010/0055386 A1 | 3/2010 | Ohno et al. | |
| 2010/0236224 A1* | 9/2010 | Kumar | B01D 53/9477 60/297 |
| 2014/0072490 A1* | 3/2014 | Dotzel | B01J 23/30 423/212 |

FOREIGN PATENT DOCUMENTS

| | | |
|---|---|---|
| EP | 2298432 A1 | 3/2011 |
| GB | 2477626 A | 8/2011 |
| JP | S553872 A | 1/1980 |
| JP | H09220468 A | 8/1997 |
| JP | 2010229012 A | 10/2010 |
| WO | 9939819 A1 | 8/1999 |

\* cited by examiner

EXTRUDED HONEYCOMB CATALYST

The invention concerns an extruded honeycomb catalyst, in particular for exhaust gas cleaning, especially in the domain of motor vehicles, where it is used in particular for nitrogen oxide reduction according to the selective catalytic reduction (SCR) method, i.e. the reduction of oxides of nitrogen using a nitrogenous reductant. The invention also concerns a set of such variously embodied honeycomb catalysts and a method for producing honeycomb catalysts.

Extruded honeycomb catalysts are one-piece, monolithic objects, which have a plurality of channels through which the exhaust gas flows during operation. These channels have an opening width of just a few millimeters. The webs delimiting the individual channels also typically have a width of just 300 μm. In extruded honeycomb catalysts, in which the solid material is catalytically active, a high proportion by volume of the solid body consists of catalytically active components. The result of this is that any modifications of the catalytic components, for example to make adaptations to different requirements and in general to pursue refinements, have a critical effect on extrudability. Altogether, this makes the development period for a new extruded honeycomb catalyst, in which the solid material is catalytically active, expensive.

WO 2010/099395 A1 discloses extruded honeycomb catalyst bodies and methods of manufacturing them. The catalyst body induces a first oxide selected from the group consisting of tungsten oxides, vanadium oxides and combinations thereof, a second oxide selected from the group consisting of cerium oxides, lanthanum oxides, zirconium oxides and combinations thereof and a zeolite. In one embodiment, an extruded zeolite core is coated with a layer of a mixture of a cerium oxide, a zirconium oxide and a tungsten oxide.

On that basis, the invention is based on the problem of specifying a honeycomb catalyst which can be adapted to new requirements with low development costs.

The problem is solved according to the invention by claim 1. According to this claim, provision is made that the honeycomb catalyst as a whole is formed from an extruded, active carrier in honeycomb form, which has at least one catalytically active component and on which in addition a catalytically active coating, in particular a washcoat coating, is applied, which thus likewise has at least one catalytic component.

The problem is further solved according to the invention by a set of honeycomb catalysts which differ in terms of their functionality, but which each have an identical carrier, and by a method for producing honeycomb catalysts of this type.

This embodiment is based on the idea of developing and providing a carrier which can be used universally for several domains of application and making specific adaptations to the respective requirements via the special washcoat coating. The particular advantage is to be seen in the fact that a different extrusion mass does not have to be developed and provided for different honeycomb catalysts. At the same time, because of the option of different combinations between the active carrier and the likewise catalytically active coatings, the entire catalytic activity can be adapted and designed as appropriate. In principle, this provides the option, firstly, of developing the catalyst with a view to a technically optimised functionality or alternatively with a view to a catalyst optimised in terms of cost. In order to achieve the latter, in particular, provision is made that the proportion of the catalytically active component in the carrier is reduced by comparison with conventional catalytically active solid extrudates.

Also it is possible to improve SCR activity of a catalyst which is otherwise sensitive to gas composition, e.g. ratio of $NO_2$:NO (see Fe/ZSM-5 (MFI) SCR in EP 1147801).

Preferred embodiments can be derived from the subclaims.

The carrier and the washcoat coating are both formed as SCR catalysts. In particular, there are three different known types of catalysts with application in the present invention:

a catalyst referred to below as a vanadium catalyst, with vanadium as catalytically active component. This usually contains, as main components, vanadium oxide, titanium oxide and tungsten oxide. In conventional catalytically active solid extrudates the proportion by volume of these catalytically active main components is about 75 to 85 vol %.

The second type of catalyst is a mixed oxide catalyst with one or more oxides or lanthanides as catalytically active components. Typically-used metal oxides are, for example, cerium oxide, zirconium oxide or tungsten oxide, which in conventional catalysts have a proportion by volume of about 75 to 85%. Mixed oxide catalysts of this type are usually free from zeolites and also free from vanadium.

As third SCR catalyst type, metal-zeolite catalysts are known with a metal zeolite as catalytically active component. In particular, this is an iron-zeolite or copper-zeolite. In a zeolite catalyst of this type, the proportion by volume of these active components lies in the range of about 60 to 70% in conventional solid extrudates.

The rest of the solid extrudate is formed by catalytically inactive components, such as binders, fillers if necessary to increase strength and optionally a plasticiser for support during extrusion.

Advantageously, the proportion by volume of the active components in the carrier is lower than in conventional solid extrudate catalysts, in which the proportions lie in the range of the upper limits stated above. All in all, the proportion by volume in the carrier can be adjusted from 10 vol. % to the upper limit stated above. In particular, however, a range under 50 vol. % or a range between 10 and 60 or 10 and 40% is set. In some variant embodiments, therefore, the greater proportion by volume of the catalyst is formed by inactive components.

In the variant embodiments with the reduced catalytically active proportion, this is preferably replaced by components which are neutral with respect to the extrusion process. This means that these are easily extrudable masses and/or materials. These include, in particular, clays (this means sheet silicates with a grain diameter of less than 2 μm), aluminium oxide or else kaolin.

The honeycomb catalyst according to the invention, in particular the second SCR catalyst washcoat coating, is free from noble metals, at least in the front area. In one preferred embodiment, a noble metal coating is applied, especially as a washcoat, onto a rear—viewed in the direction of flow of the exhaust gas during operation—area. This serves to prevent ammonia slip. The rear area therefore forms what is known as an ASC catalyst (ammonia slip catalyst).

Advantageously this noble metal coating is thereby embedded in the form of a sandwich between the carrier and a washcoat coating extending over the entire length, which is in particular embodied as an SCR catalyst. That is, the noble metal-containing washcoat is applied as a layer directly onto the carrier and the second SCR catalyst washcoat layer is applied over an entire length of the extruded active carrier, including the noble metal-containing washcoat. This arrangement has the benefit that ammonia which slips past the upstream zone of the first and second SCR catalysts can be oxidised to $NO_x$ on the lower, noble metal layer and this $NO_x$ then passes through the second SCR catalyst layer to exit the catalyst structure and contacts in-coming ammonia, whereby the $NO_x$ is reduced to $N_2$ on the second SCR catalyst.

For all variant embodiments, the washcoat coating has a relatively high porosity, so that the exhaust gas to be cleaned also comes into contact with the catalytically active carrier.

In order to achieve a good catalytic activity, the carrier also has a high porosity. Both the carrier and the washcoat coating typically have a large BET surface area in the range of about 40 to 80 $m^2/g$.

The layer thickness of the washcoat coating preferably lies in the range of 30 to 100 µm, in particular in the range of about 40 to 60 µm. Advantageously, only a single washcoat coating is applied to the carrier. Because the carrier is also active, a multi-layered washcoat coating is not necessary and preferably not provided. It is, however, possible.

In particular, in the case of catalytically active solid extrudates with a reduced proportion of active components in the solid extrudate, the web width of the webs of the honeycomb structure can be reduced. In conventional extruded honeycomb catalysts made from a catalytically active solid extrudate, the web widths are in the range of about 300 µm. This is preferably reduced to a range of about 150 to 220 µm, in particular to a range of about 180 µm.

Using the concept of an active washcoat coating on a carrier, different active honeycomb catalysts can be designed according to requirements to meet different needs.

These different combinations take into account the various advantages and disadvantages of the individual catalysts, which are preferably combined in such a way that their advantages are increased and their disadvantages are reduced. So the individual catalysts differ firstly from an economic viewpoint with respect to their price. Here, for example, the copper-zeolite catalyst is the most expensive, while the vanadium catalyst is the cheapest. With respect to their technical characteristics, NOx-activity across the temperature range is especially important, i.e. the capacity for NOx-reduction at both low and high temperatures. Furthermore, sulphur tolerance and in particular $NO_2$ tolerance are of particular importance. Finally, the temperature stability of different materials is also relevant.

Depending on the intended use, the following preferred combination possibilities are suitable:

a) Embodiment of the carrier as a mixed oxide catalyst with a washcoat coating, which can be either an Fe- or a Cu-zeolite catalyst. The advantage of the mixed oxide catalyst here lies in its low storage capacity, in particular ammonia storage capacity. Ammonia is regularly used in the SCR method as a typical reducing agent. This enables simple dosing as a function of the current demand. The mixed oxide catalyst displays weaknesses in the higher temperature range, which are equalised by the washcoat coating. Conversely, in the lower temperature range it is better by comparison with the Fe-zeolites, so that, overall, improved activity is achieved over the entire temperature range.

b) A washcoat coating made from a vanadium catalyst is applied to a carrier made from a mixed oxide catalyst. The advantage of the vanadium catalyst consists in its good sulphur tolerance, which is, conversely, a weakness of the mixed oxide catalyst. Conversely, the mixed oxide catalyst has higher activity at lower temperatures. A further advantage of the mixed oxide catalyst can be seen in its good $NO_2$ tolerance.

c) A washcoat made from a copper-zeolite is applied to a carrier made from an Fe-zeolite. The very good activity in the lower temperature range of the copper zeolite is supplemented by the good sulphur tolerance of the iron zeolite. Also, a combination of this type is especially tolerant to $NO_2$, since iron has especially good activity when there are medium and high $NO_2$ levels, while copper has a very good activity when there are low $NO_2$ levels in the exhaust gas.

d) An Fe-zeolite is applied to a Cu-zeolite as washcoat. Here, the same advantages apply as in the aforementioned combination.

e) A vanadium catalyst as washcoat is applied to an Fe-zeolite as carrier. This combination has improved sulphur resistance and a high $NO_2$ tolerance, since the iron-zeolite catalyst has high activity when there are high $NO_2$ levels in the exhaust gas, contrary to the vanadium catalyst.

f) The combination of identical catalysts, for example Fe-zeolite catalyst with Fe-zeolite catalyst. This increases catalytic activity overall.

g) An Fe-zeolite catalyst is applied to a carrier made from a vanadium catalyst. This achieves a very good activity over a wide range of $NO_2/NOx$-ratios.

The concept described here, namely the provision of an active carrier in combination with an active washcoat coating, therefore also finds expression in the method according to the invention. To produce honeycomb catalysts with different characteristics, therefore, a carrier type is supplied and stored which is then provided, depending on the domain of application, with different washcoat coatings.

According to a further aspect, there is provided an exhaust system for a vehicular lean burn internal combustion engine comprising an extruded honeycomb catalyst according to the invention disposed in a flow conduit thereof.

In one embodiment, the exhaust system comprises means for injecting a nitrogenous reductant or a precursor thereof into the exhaust gas upstream of the extruded honeycomb catalyst.

According to a further aspect according to the present invention, there is provided a lean burn internal combustion engine comprising an exhaust system according to the invention comprising a catalyst for generating $NH_3$ in situ in exhaust gas upstream of the extruded honeycomb catalyst and control means for changing an exhaust gas composition to a composition which promotes in situ $NH_3$ on the catalyst for generating $NH_3$ in situ.

In one embodiment, the catalyst for generating $NH_3$ in situ in exhaust gas upstream of the extruded honeycomb catalyst is a diesel oxidation catalyst or a $NO_x$ absorber catalyst and in particular comprises a platinum group metal and preferably also a lanthanide element, preferably cerium optionally in combination with one or more stabilisers such as zirconia and/or a rare earth element.

According to a further aspect, there is provided a vehicle comprising an exhaust system according to the invention or a lean burn internal combustion engine according to the invention.

Figure 2:
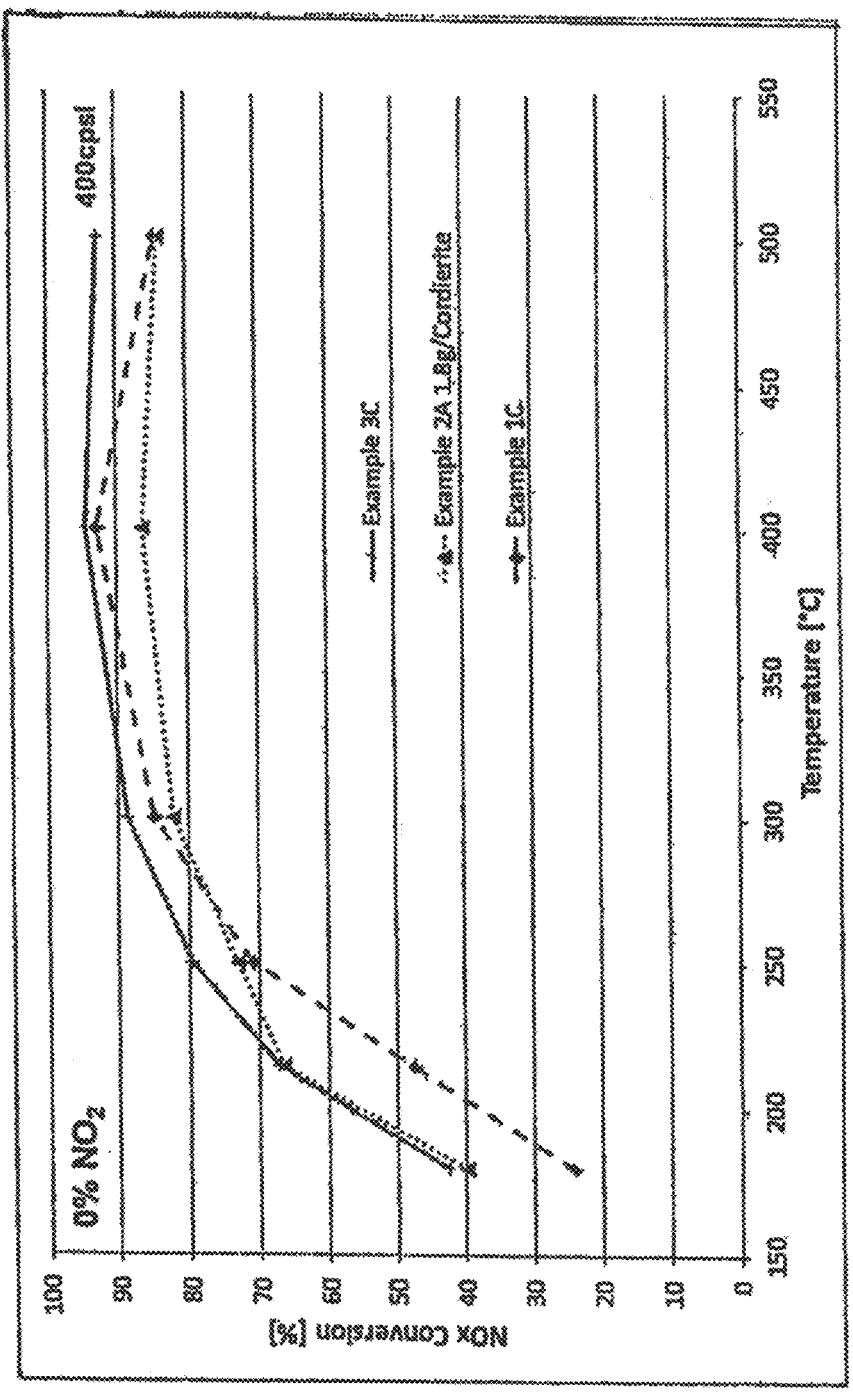
Figure 3:
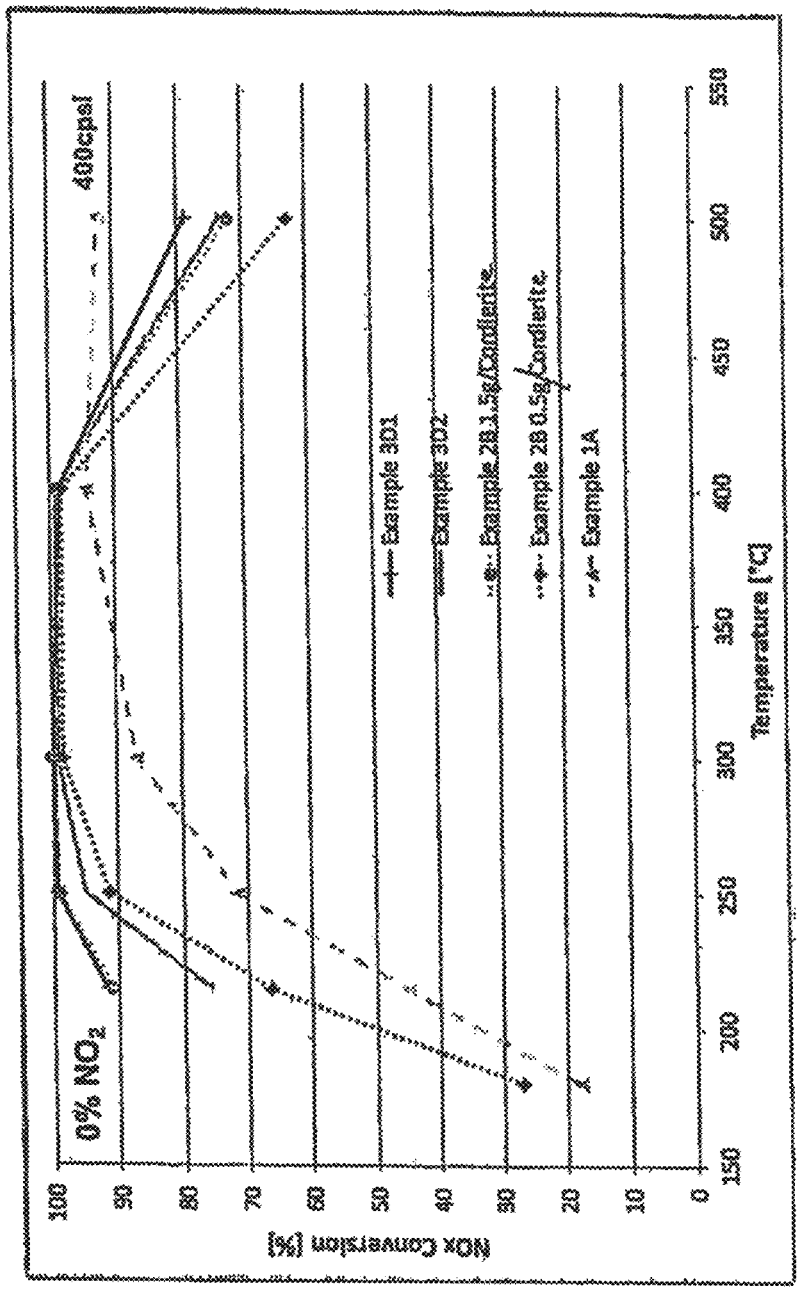
Figure 4:
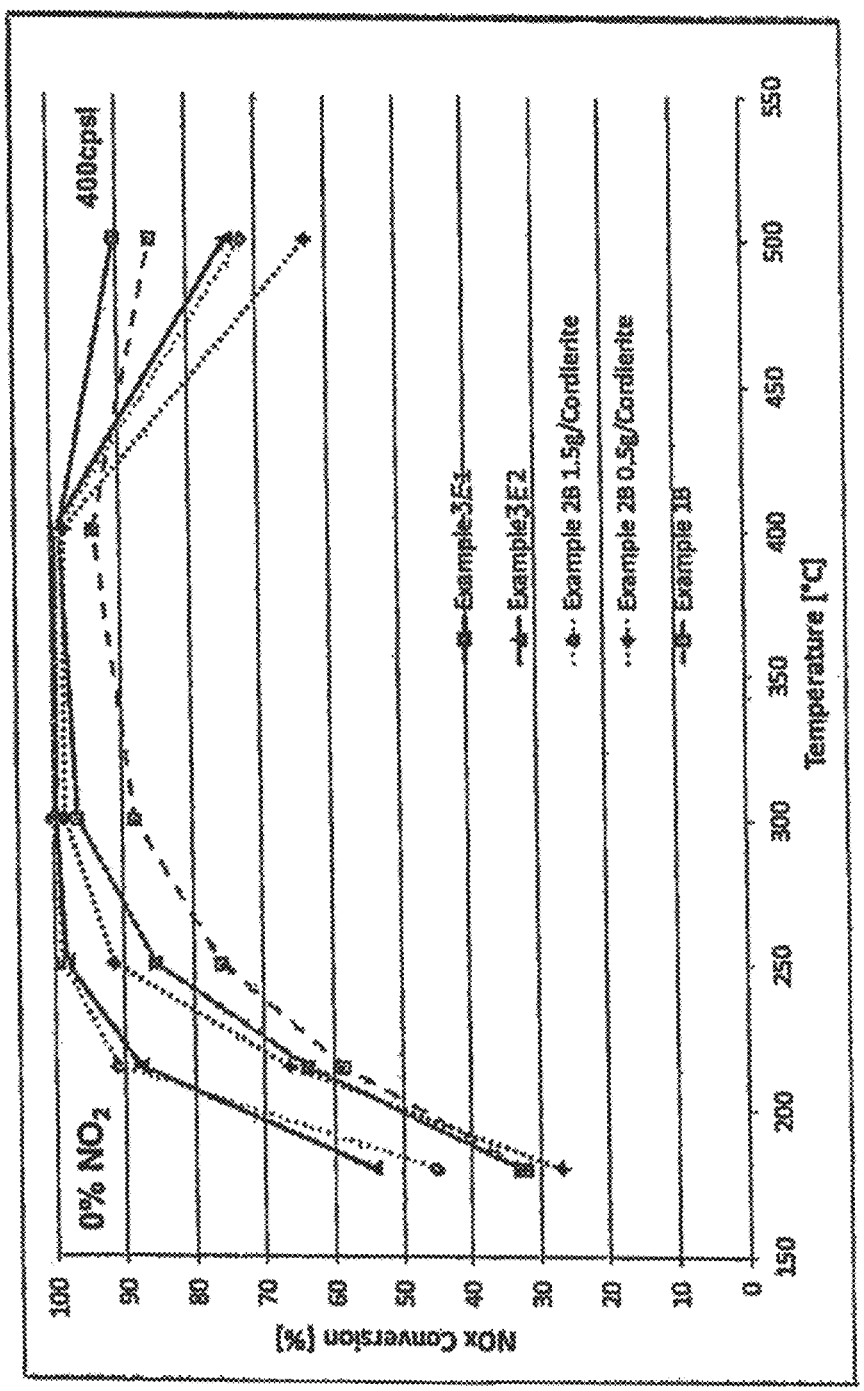

In order that the present invention may be more fully understood, the following Examples are provided by way of illustration only and with reference to the accompanying drawings, wherein:

FIG. 1 is a graph showing the $NO_x$ conversion activity at various temperatures for an extruded honeycomb catalyst according to the present invention comprising an extruded active carrier comprising a $V_2O_5/WO_3/TiO_2$ or Fe-ZSM-5 (MFI) zeolite first SCR catalyst washcoated with a $WO_3/CeO_2$—$ZrO_2$ second SCR catalyst compared with the second SCR catalyst coated on an inert cordierite honeycomb and the extruded active carriers without the second SCR catalyst coating;

FIG. 2 is a graph showing the $NO_x$ conversion activity at various temperatures for an extruded honeycomb catalyst according to the present invention comprising an extruded active carrier comprising a Fe-ZSM-5 (MFI) zeolite first SCR catalyst washcoated with a Cu-SAPO-34 (CHA) second SCR catalyst compared with the second SCR catalyst coated on an inert cordierite honeycomb and the extruded active carrier without the second SCR catalyst coating;

FIG. 3 is a graph showing the $NO_x$ conversion activity at various temperatures for an extruded honeycomb catalyst according to the present invention comprising an extruded active carrier comprising a Fe-Beta zeolite first SCR catalyst washcoated with a Cu-SSZ-13 (CHA) second SCR catalyst at two different washcoat loadings compared with the same loadings of the second SCR catalyst coaxed on an inert cordierite honeycomb and the extruded active carrier without the second SCR catalyst coating; and FIG. 4 is a graph showing the $NO_x$ conversion activity at various temperatures for an extruded honeycomb catalyst according to the present invention comprising an extruded active carrier comprising a $V_2O_5/WO_3/TiO_2$ first SCR catalyst washcoated with a Cu-SSZ-13 (CHA) second SCR catalyst at two different washcoat loadings compared with the same loadings of the second SCR catalyst coated on an inert cordierite honeycomb and the extruded active carrier without the second SCR catalyst coating.

EXAMPLES

Example 1

Preparation of Extruded Active Carrier in Honeycomb Form Comprising First SCR Catalyst Example 1A Extruded Active Carrier Containing Fe-Beta Zeolite Powdered commercially available Beta zeolite in hydrogen form is mixed with iron oxide ($Fe_2O_3$), glass fibres, Kaolin, powdered synthetic boehmite and the plastieisers polyethylene oxide (2.25 wt. %) and oleic acid (1.62 wt. %) (both based on 100% of the total inorganic solids content) and is processed in an aqueous solution with a pH-value of 5-6 into a shapeable and flowable slip. When the mixture is well plasticised, cellulose is added at 2.25 wt % based on 100% of the total inorganic solids content. The quantitative proportions of the starting materials are selected in such a way that the active material of the finished solid catalyst body contains 70.34% by weight of zeolite, iron and iron compounds; 2.76% by weight of the Kaolin; 15.94% by weight of $\gamma$-$Al_2O_3$; and 4.84% by weight of glass fibers. The shapeable mixture is extruded into a flow-through honeycomb catalyst body, i.e. with continuous channels and with a circular cross-section exhibiting a cell density of 400 cpsi (cells per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body. It is found that by using the method described that at least some of the iron introduced into the mixture becomes ion-exchanged with the zeolite.

Example 1B

Extruded Active Carrier Containing $V_2O_5/WO_3/TiO_2$

Powdered commercially available tungsten-containing $TiO_2$ at 10 wt. % tungsten is mixed with glass fibres, Kaolin, a low alkaline clay filler and powdered synthetic boehmite Ammonium metavanadate: 1.88 wt. %; 2-Aminoethanol: 1.5 liters; Lactic acid 90%: 0.48 wt %; Ammonia 25%: 8.97 wt % and the plastieisers polyethylene oxide (0.86 wt. %) and oleic acid (0.14 wt. %) (all based on 100% of the total inorganic solids content) and is processed in an aqueous solution with a pH-value of 5-6 into a shapeable and flowable slip. When the mixture is well plasticised, cellulose is added at 0.86 wt % based on 100% of the total inorganic solids content. The quantitative proportions of the starting materials are selected in such a way that the active material of the finished solid catalyst body contains approximately 72 wt % $V_2O_5/WO_3/TiO_2$; silica 1.20 wt %; Kaolin 2.85 wt %; clay 2.85 wt. %; and glass fibres 6.93 wt. %. The shapeable mixture is extruded into a flow-through honeycomb catalyst body, i.e. with continuous channels and with a circular cross-section exhibiting a cell density of 400 epsi (ceils per square inch). Subsequently, the catalyst body is freeze dried for 1 hour at 2 mbar according to the method described in WO 2009/080155 (the entire contents of which is incorporated herein by reference) and calcined at a temperature of 580° C. to form a solid catalyst body.

Example 1C

Extruded Active Carrier Containing Fe-ZSM-5 (MFI) Zeolite

An ion-exchanged, synthetic ZSM-5 zeolite, the active material of which contains 5% by weight of iron, is selected as zeolite. The powdered ZSM-5 zeolite is mixed with glass fibers and powdered synthetic boehmite and is processed in an acetous aqueous solution with a pH-value of 3.5 into a shapeable and flowable slip by admixture of cellulose, and oleic acid and polyethylene glycol plasticizers. The quantitative proportions of the starting materials are selected in such a way that the active material of the finished solid catalyst body contains 75% by weight of zeolite containing the iron and iron compounds; 11.8% by weight of $\gamma$-$Al_2O_3$ and 8% by weight of glass fibers. The shapeable mixture is extruded into a honeycomb catalyst body with continuous channels and with a round cross-section exhibiting a cell density of 400 cpsi (cells per square inch). Subsequently, the catalyst body is dried at a temperature of 90° C. and calcined to form a solid catalyst body at a temperature of 600° C.

Example 2

Preparation of Washcoat Compositions Comprising Second SCR Catalyst

Method of Making Fresh 3 wt % Cu/Zeolites (Examples 2A and 2B)

Commercially available SAPO-34 (CHA) (Example 2A) and SSZ-13 (CHA) (Example 2B) were $NH_4^-$ ion exchanged in a solution of $NH_4NO_2$, then filtered. The resulting materials were added to an aqueous solution of $Cu(NO_2)_2$ with stirring. The slurry was filtered, then washed and dried. The procedure can be repeated to achieve a desired metal loading. The final product was calcined.

Example 2C

Method of Making $WO_x/CeO_2$—$ZrO_2$

A catalyst comprising 15 wt % tungsten supported on a ceria-zirconia mixed oxide comprising 50:50 weight % of ceria and zirconia was prepared by an incipient wetness impregnation method comprising dissolving sufficient ammonium metatungstate to give the desired 15 wt % W loadings in deionised $H_2O$. The total volume of solution was equivalent to the pore volume of the support sample (incipient wetness technique). The solution was added to the mixed oxide support material and the resultant mixture was dried overnight at 105° C. and then calcined at 700° C. for 3 hours.

Example 3

Preparation of Extruded Honeycomb Catalysts

Extruded active carriers of Example 1 were coated with a washcoat comprising the second SCR catalyst of Example 2 using the method disclosed in WO 99/47260, i.e. comprising the steps of (a) locating a containment means on top of a extruded active carrier support, (b) dosing a pre-determined quantity of a liquid component into said containment means, either in the order (a) then (b) or (b) then (a), and (c) by applying pressure or vacuum, drawing said liquid component into at least a portion of the extruded active carrier support, and retaining substantially all of said quantity within the extruded active carrier support. The coated extruded active carriers were then dried in air at 100° C. for 1 hour and calcined at 500° C. for 2 hours.

The following combinations of extruded active carrier and washcoat were prepared.

TABLE 1

| Extruded Honeycomb Catalyst Example No. | Extruded Catalyst Carrier Example Component | Washcoat Example Component | Washcoat Loading (g/in$^3$) |
| --- | --- | --- | --- |
| 3A | 1B | 2C | 3.1 |
| 3B | 1C | 2C | 3.1 |
| 3C | 1C | 2A | 1.8 |
| 3D1 | 1A | 2B | 1.5 |
| 3D2 | 1A | 2B | 0.5 |
| 3E1 | 1B | 2B | 0.5 |
| 3E2 | 1B | 2B | 1.5 |

Example 5

Synthetic Catalytic Activity Tests

A 2.54 cm×14 cm core was cut from each of the extruded honeycomb catalysts of Example 3 and the catalysts were tested at steady state at the following temperature points; 180° C., 215° C., 250° C., 300° C., 400° C. and 500° C. in a synthetic catalytic activity test laboratory apparatus using the following synthetic gas mixture: $O_2$ 9.3%; $H_2O$ 7.0%; $NO_x$ 100 ppm (NO only); $NH_3$ 100 ppm; Balance $N_2$ (Swept Volume: 60.000 liters/hr).

The results including comparative data are shown in FIGS. 1 to 4.

FIG. 1 shows the results for Examples 3A and 3B compared with an identical washcoat composition (i.e. Example 2C) coated on an inert cordierite honeycomb carrier at 400 cpsi at 3.4 g/in$^3$ loading; and the extruded catalyst carriers of Examples 1B and 1C per se. As can be seen from the results, Examples 3A and 3B show increased $NO_x$ conversion performance across the full temperature range.

FIG. 2 shows the results for Example 3C compared with an identical washcoat composition (i.e. Example 2 A) coated on an inert cordierite honeycomb carrier at 400 cpsi at 1.8 g/in$^3$ loading; and the extruded catalyst carrier of Example 1C per se. As can be seen from the results, there is a positive effect in the 200-500° C. temperature range tested.

FIG. 3 shows the results for Examples 3D1 and 3D2 compared with identical washcoat compositions (i.e. Example 2B) coated on an inert cordierite honeycomb carrier at 400 cpsi at 1.5 g/in$^3$ and 0.5 g/in$^3$ loadings; and the extruded catalyst carrier of Example 1A per se. As can be seen from the results, Examples 3D1 and 3D2 show increased $NO_x$ conversion performance at <300° C. and >400° C., FIG. 4 shows the results for Examples 3E1 and 3E2 compared with identical washcoat compositions (i.e. Example 2B) coated on an inert cordierite honeycomb carrier at 400 cpsi at 1.5 g/in$^3$ and 0.5 g/in$^3$ loadings; and the extruded catalyst carrier of Example 1B per se. As can be seen from the results, Examples 3E1 and 3E2 show increased $NO_x$ conversion performance at >400° C.

For the avoidance of any doubt the entire contents of all documents cited herein are incorporated herein by reference in their entirety.

The invention claimed is:

1. A set of various different extruded honeycomb catalysts for nitrogen oxide reduction according to the selective catalytic reduction (SCR) method in exhaust gases from motor vehicles, each extruded honeycomb catalyst comprising an extruded catalyst carrier in honeycomb form comprising a first SCR catalytically active component and with a plurality of channels through which the exhaust gas flows during operation, and a washcoat coating comprising a second SCR catalytically active component, the washcoat coating being in the form of a layer applied to the extruded catalyst carrier, wherein the first SCR catalytically active component and the second SCR catalytically active component are each independently selected from the group consisting of:

(i) vanadium catalyst with vanadium as catalytically active component;
    (ii) mixed-oxide catalyst with one or more oxides, in particular those of transition metals or lanthanides as catalytically active component; and
    (iii) a metal zeolite catalyst comprising a Cu-CHA catalyst;

wherein all the honeycomb catalysts in the set have an identical carrier.

2. The set of extruded honeycomb catalysts according to claim 1, wherein the washcoat coating, at least in a frontal area of the carrier—in relation to a direction of flow of the exhaust gas during operation—is free from noble metals.

3. The set of extruded honeycomb catalysts according to claim 1, wherein the carrier has a rear area—in relation to a direction of flow of the exhaust gas during operation—on which there is a noble metal coating to prevent ammonia slip.

4. The set of extruded honeycomb catalysts according to claim 3, wherein the washcoat coating extends over the entire length of the carrier and also covers the noble metal coating in the rear area of the carrier.

5. The set of extruded honeycomb catalysts according to claim 1, wherein the washcoat coating and the carrier have a BET surface area in the range of about 40-80 m²/g.

6. The set of extruded honeycomb catalysts according to claim 1, wherein the layer thickness of the washcoat coating lies in the range of 30 to 100 μm.

7. The set of extruded honeycomb catalysts according to claim 1, wherein the honeycomb form has webs and the web width is 150 to 220 μm.

8. The set of extruded honeycomb catalysts according to claim 1, wherein the extruded catalyst carrier is a mixed oxide catalyst and the washcoat coating is a Cu-CHA catalyst.

9. The set of extruded honeycomb catalysts according to claim 1, wherein the extruded catalyst carrier is a mixed oxide catalyst and the washcoat coating is a vanadium catalyst.

10. The set of extruded honeycomb catalysts according to claim 1, wherein at least one of the extruded catalyst carrier and the washcoat coating is a Cu-CHA catalyst.

11. The set of extruded honeycomb catalysts according to claim 1, wherein the extruded catalyst carrier is a Cu-CHA catalyst.

12. The set of extruded honeycomb catalysts according to claim 1, wherein the extruded catalyst carrier is a Cu-CHA catalyst and the washcoat coating is a vanadium catalyst.

13. The set of extruded honeycomb catalysts according to claim 1, wherein the extruded catalyst carrier and the washcoat coating are formed from a Cu-CHA catalyst.

14. The set of extruded honeycomb catalysts according to claim 1, wherein the extruded catalyst carrier and the washcoat coating are formed from a vanadium catalyst.

15. The set of extruded honeycomb catalysts according to claim 1, wherein the extruded catalyst carrier and the washcoat coating are formed from the same mixed-oxide with one or more of cerium oxide, zirconium oxide, and tungsten oxide as catalytically active component.

16. The set of extruded honeycomb catalysts according to claim 1, wherein the carrier is a vanadium catalyst and the washcoat coating is a Cu-CHA catalyst.

17. An exhaust system for a vehicular lean burn internal combustion engine comprising a set of extruded honeycomb catalysts according to claim 1 disposed in a flow conduit thereof.

18. An exhaust system according to claim 17, comprising means for injecting a nitrogenous reductant or a precursor thereof into the exhaust gas upstream of the set of extruded honeycomb catalysts.

19. A lean burn internal combustion engine comprising an exhaust system according to claim 17 comprising a catalyst for generating $NH_3$ in situ in exhaust gas upstream of the set of extruded honeycomb catalysts and control means for changing an exhaust gas composition to a composition which promotes in situ $NH_3$ on the catalyst for generating $NH_3$ in situ.

20. A lean burn internal combustion engine according to claim 19, wherein the catalyst for generating $NH_3$ in situ in exhaust gas upstream of the extruded honeycomb catalyst is a diesel oxidation catalyst or a NOx absorber catalyst.

21. A vehicle comprising an exhaust system according to claim 17.

22. The set of extruded honeycomb catalysts according to claim 1, wherein the extruded catalyst carrier comprises a neutral component.

23. The set of extruded honeycomb catalysts according to claim 22, wherein the neutral component is selected from the group consisting of a clay, aluminum oxide, and kaolin.

24. Method for producing honeycomb catalysts according to claim 1, wherein identically carriers are provided and coated with different washcoats.

25. The set of extruded honeycomb catalysts according to claim 1, wherein the vanadium catalyst contains as main components vanadium oxide, titanium oxide, and tungsten oxide.

26. The set of extruded honeycomb catalysts according to claim 1, wherein the metal zeolite catalyst contains a Cu-CHA catalyst in a proportion by volume of 10 to 70%.

27. The set of extruded honeycomb catalysts according to claim 1, wherein the extruded catalyst carrier further comprises at least one of a binder, a filler and a glass fiber.

* * * * *